United States Patent

Durand et al.

[11] Patent Number: 6,106,604
[45] Date of Patent: Aug. 22, 2000

[54] BITUMEN EMULSION, PROCESS OF PRODUCING A BITUMEN EMULSION AND PROCESS OF PRODUCING A BITUMINOUS MATERIAL FOR THE CONSTRUCTION OR MAINTENANCE OF PAVEMENTS

[75] Inventors: Graziella Durand, Chevreuse; Jean-Eric Poirier, Montigny-le-Bretonneux; Michel Chappat, Maurepas, all of France

[73] Assignee: Colas, Boulogne-Billancourt Cedex

[21] Appl. No.: 09/038,704

[22] Filed: Mar. 9, 1998

[30] Foreign Application Priority Data

Mar. 10, 1997 [FR] France ............... N 97 02 809

[51] Int. Cl.⁷ ............... B01J 13/00; C08L 95/00
[52] U.S. Cl. ............... 106/277; 516/43; 516/113; 516/140
[58] Field of Search ............... 516/43, 113; 106/277; 507/921

[56] References Cited

U.S. PATENT DOCUMENTS

| | | | |
|---|---|---|---|
| 3,257,231 | 6/1966 | McEachran et al. | 106/277 X |
| 3,359,738 | 12/1967 | Dybalski et al. | 106/277 X |
| 3,513,005 | 5/1970 | Bradshaw et al. | 106/277 |
| 3,575,882 | 4/1971 | Vandegaer et al. | 264/4.7 |
| 3,859,227 | 1/1975 | Dwyer | 106/277 X |
| 4,008,096 | 2/1977 | Knapp | 106/277 |
| 4,919,209 | 4/1990 | King | 507/921 X |
| 5,102,559 | 4/1992 | McDougall et al. | 507/921 X |
| 5,164,099 | 11/1992 | Gupta et al. | 507/921 X |
| 5,256,195 | 10/1993 | Redelius | 106/277 |
| 5,474,607 | 12/1995 | Holleran | 106/277 |

FOREIGN PATENT DOCUMENTS

| | | | |
|---|---|---|---|
| 0491107 | 6/1992 | European Pat. Off. | |
| 2618350 | 1/1989 | France | |
| 453760 | 2/1988 | Sweden | |
| 2208270 | 3/1989 | United Kingdom | |
| 2255291 | 11/1992 | United Kingdom | 106/277 |

OTHER PUBLICATIONS

Database WPI, Section Ch, Week 8823, Derwent Publications Ltd., London, GB; Class A95, AN 88–159528, XP002049010 (1988).

*Primary Examiner*—Richard D. Lovering
*Attorney, Agent, or Firm*—Greenblum & Bernstein, P.L.C.

[57] ABSTRACT

Bitumen emulsion including bituminous phase having one of pure bitumen, fluxed bitumen, and modified bitumen. The bitumen emulsion also includes an aqueous phase including water and an emulsifying agent. The bitumen emulsion further includes a breaking agent encapsulated in capsules allowing control of breaking of the bitumen emulsion, the control involving rupture of the capsules from a mechanical effect by a mechanical action produced on the bitumen emulsion. Processes of producing a bitumen emulsion. Processes of controlling breaking of a bituminous emulsion.

11 Claims, No Drawings

BITUMEN EMULSION, PROCESS OF PRODUCING A BITUMEN EMULSION AND PROCESS OF PRODUCING A BITUMINOUS MATERIAL FOR THE CONSTRUCTION OR MAINTENANCE OF PAVEMENTS

BACKGROUND OF THE INVENTION

1. Field of the Invention

The invention relates to a bitumen emulsion, a process of producing a bitumen emulsion and a process of producing a bituminous material for the construction or maintenance of pavements.

The invention more particularly relates to emulsions for surface coatings and emulsions for preparing cold mixes, as well as a process of producing such emulsions and a process of producing a bituminous material with such emulsions.

2. Discussion of Background

The emulsions referred to above are aqueous emulsions whose breaking is in part affected by the evaporation of the water. In the case of an aqueous emulsion of bitumen for a coating containing aggregates, the breaking of the emulsion causes the fixing of the aggregates on the surface of the pavement on which the coating has been spread, and the maintenance of cohesion between the aggregates. Various processes aimed at controlling the breaking have been tried, with a view to improving the quality of the coating. Examples of these processes include the simultaneous spreading on the pavement of an aqueous emulsion of bitumen and a breaking agent sprayed into the emulsion jet, so that the breaking of the emulsion occurs rapidly within the mass of the emulsion at the moment of spreading. Another solution consists of incorporating breaking agents in bitumen emulsion in the form of an emulsion or suspension in a solvent phase, or the use of breaking agents within an envelope created mechanically for example by the method known as rotative surfaces, for example by centrifugation.

In the case of an aqueous bitumen emulsion applied for the preparation of cold mixes, in general, and for the preparation of the wearing course of a pavement in particular, the breaking of the emulsion is also affected by the evaporation of the water, but differs from the breaking of the emulsions used for the first application in that the emulsion must remain stable for a long time and must in particular allow the complete coating of all the aggregate fractions, from the initial mixing step, during the transport of the mix and in the finishing leveller. In addition, the breaking of the emulsion must be able to be performed in such a way that the wearing course can be compacted and that the cohesion of the mix is homogeneous over the whole thickness of the coating. This requires both a long handling time and control of the breaking of the emulsion.

Document FR-A-2.618.350 describes a process allowing initiation the breaking of a bituminous emulsion by means of a breaking agent implemented in the form of microcapsules whose casing is a material which is chemically and/or physically attacked after a predetermined length of contact with the emulsion. This process allows the moment at which the breaking occurs to be delayed. However, once the breaking agent has been introduced and dispersed into the emulsion, the time at which the breaking occurs can no longer be changed, as it depends on the length of contact of the capsules with the emulsion. It follows that this known process does not allow the breaking of a bitumen emulsion to be controlled, but only to be delayed by some tens of minutes.

Moreover, the process cited above requires that the nature of the casing of the microcapsules is appropriate to that of the emulsion. Thus, an acid emulsion requires—in addition to a basic breaking agent—a casing sensitive to acids.

SUMMARY OF THE INVENTION

An object of this invention is to offer a bitumen emulsion whose breaking can be controlled, avoiding the disadvantages listed above.

An object of the invention is achieved with a bitumen emulsion composed of a bituminous phase comprising a bitumen chosen from amongst the pure bitumens, the fluxed bitumens and the modified bitumens and an aqueous phase comprising at least water and an emulsifying agent.

According to the invention, the bitumen emulsion contains an encapsulated emulsion breaking agent allowing control of the breaking of the emulsion, the rupture of the capsules resulting from a mechanical effect.

According to advantageous embodiments of the invention, the invention may have the following characteristics, taken alone or in all the technically possible combinations:

- the capsules containing the emulsion breaking agent are able to be ruptured by pressure at the compaction pressure.
- the capsules containing the emulsion breaking agent are able to be ruptured by shearing.
- the breaking agent is contained in capsules with an average diameter of less than 100 $\mu$m.
- the breaking agent is contained in capsules with an average diameter of between 5 and 50 $\mu$m.
- the wall of the capsules is composed of polymers of the polycondensate type obtained by interfacial polycondensation.
- the capsules containing the emulsion breaking agent are composed of polyamide.
- the capsules containing the emulsion breaking agent are of polyurea.
- the capsules containing the emulsion breaking agent are composed of polyamide-polyurea.

The capsules separate readily from their reaction medium, which is an oily medium, and can thus be transferred directly into the emulsion or into an aqueous phase.

The invention also relates to a process of producing a bitumen emulsion, comprising introducing a bituminous phase comprising a bitumen and an aqueous phase comprising water and an emulsifying agent into a colloid mill, and agitating the bituminous and aqueous phases.

According to the invention, this process of producing a bitumen emulsion also includes introducing an encapsulated emulsion breaking agent allowing control of the breaking of the emulsion, the breaking agent being able to be liberated by mechanical action on the emulsion.

The capsules are added to the emulsion which is kept hot after its production. The homogenization is performed by simple agitation.

The invention also relates to a process of producing a bituminous material for pavements comprising a bitumen emulsion and aggregates. This process comprises introducing a bituminous emulsion and aggregates into a mixer and mixing.

According to the invention, this process also includes introducing an encapsulated emulsion breaking agent allowing control of the breaking of the emulsion, the breaking agent being able to be liberated by mechanical action on the emulsion.

According to advantageous embodiments of this process of producing a bituminous emulsion, the introducing of the encapsulated emulsion breaking agent may be performed either before, or after that of the introduction of the aggregates.

According to a variant of these embodiments of the invention, the breaking agent may be introduced into the bitumen emulsion before the spreading of the mixture thus obtained, whereas the aggregates are introduced after the spreading of the mixture.

The invention thus provides a solution to the problem of controlling the breaking of bituminous emulsions, applicable equally well to bitumen emulsions alone, such as tack coats, as to cold mixes and surface coatings.

DETAILED DESCRIPTION

A bitumen emulsion containing between 55% and 75% by weight of bituminous binder is prepared in a colloid mill from a bituminous phase comprising either a pure bitumen, or a fluxed bitumen (for example with a petroleum, steam-cracking or visbreaking distillate flux), or a bitumen modified by a polymer (for example a bitumen modified by styrene-butadiene-styrene) and from an aqueous phase comprising at least water and an emulsifier.

The encapsulated breaking agent is prepared from an emulsion breaking agent which is a chemical agent whose nature depends on the type of emulsifying agent. The emulsions are most often cationic emulsions. In this case, the breaking agent may be an aqueous solution of a strong inorganic base (NaOH) or an anionic surface-active agent (such as an alkylsulfate, an alkylsulfonate or alkylsulfosuccinate or one of their mixtures) or an anionic polymeric agent. The breaking agent in aqueous solution is contained in capsules whose walls are composed of polymers of the polycondensate type such as polyureas, polyamides, and polyamides/polyureas (mixed walls).

The encapsulated emulsion breaking agent is mixed with the bitumen emulsion. This mixing is advantageously carried out during the preparation of the bitumen emulsion. The mixture is then stored hot for a period of between a few hours to about fifteen days. The storage time is preferably between about 2 and 8 days.

The capsules prepared for containing the emulsion breaking agent are stable in their reaction medium in other words a solvent, for at least 9 to 10 months. The capsules also withstand temperatures of the order of 60 to 90° C.

In addition, the capsules are characterized by their average diameter which is between 5 and 50 $\mu$m. The capsules are broken by pressure at the compaction pressure or by shearing during passage through the spreader jets. When the active principle, in other words the breaking agent, is liberated, the breaking of the emulsion takes place.

Since the breaking agent is distributed over the whole mass of the emulsion, the breaking of the emulsion is more complete than when the breaking agent is sprayed separately or in the bitumen emulsion jet. It occurs within the mass of the emulsion itself. This thus avoids in particular the formation of a broken film on the surface which can delay the breaking within the mass of the emulsion. This phenomenon is even more marked in the presence of an elastomeric bitumen emulsion.

The advantage of using an encapsulated breaking agent may be illustrated by a comparison between the stability of a non-encapsulated agent, which causes the breaking of an emulsion after a few minutes at the latest, and the stability of an encapsulated breaking agent which is of several days.

Other characteristics and advantages of the invention will emerge from the description of two examples of the realization of the preparation of an emulsion given below.

EXAMPLE 1

I. Preparation of polyamide-polyurea capsules
  Preparation of reagents:
   Introduce 2.5 g of non-ionic emulsifier and 437.5 g of oil into a 2 liter beaker (phase I);
   Dissolve 2.5 g of $Na_2CO_3.H_2O$ and the diamine in 40 g of an aqueous solution in a conical flask and stir magnetically (phase II);
   Introduce the acid dichloride and diisocyanate in 217.5 g of oil (the same as in phase I) in a conical flask and stir magnetically (phase III).

The molar ratio acid dichloride/diisocyanate was between 20:80 and 50:50, preferably between 35:65 and 50:50; and the molar ratio diamine/other monomers was between 1:5 and 1:1, preferably between 1:2 and 1:1. The quantity of polymer formed was from 0.05 to 0.1 moles for the quantity of solvent of the example.

Reactions:
   Stir the 2 liter beaker mechanically at 450 r.p.m. The stirring paddle must be at about 1 cm from the bottom of the beaker so as to ensure homogeneous stirring. Introduce phase II manually. After fifteen minutes, verify using a microscope that the emulsion has been formed correctly. The particles must have homogeneous diameters and be well separated. The diameters must be less than 15 $\mu$m. Then introduce phase III via a dropping funnel over 15 minutes. When the addition is complete, reduce the stirring to 350 r.p.m. The reaction lasted about 6 hours. This preparation yielded capsules which are spherical, well separated, resistant to pressure and with regular diameters of 5 to 10 $\mu$m. This preparation may be modified so as to encapsulate more or less of the breaking agent. The capsules thus obtained had a stability of from 4 to 6 days in a bitumen emulsion at 60° C. up to 110 days in water at ambient temperature and more than twelve months in the reaction medium.

II. Mixing the capsules with the emulsion

EXAMPLE 2

I. Preparation of polyurea capsules
  Preparation of reagents:
   Weigh 8 g of non-ionic surface-active agent and 344 g of hydrocarbon solvent in a 2 liter beaker (phase I);
   Weigh 40 g of breaking agent in aqueous solution and a diamine compound in a conical flask and mix with magnetic stirring (phase II);
   Weigh 40 ml of the same hydrocarbon solvent as in phase I and a diisocyanate compound in a conical flask and stir magnetically (phase III);

The molar ratio diamine/diisocyanate was between 60:40 and 40:60. The total proportion of polycondensate polymer was from 1 to 2.7 g per 100 ml of hydrocarbon solvent.

Reactions:
   Emulsify phase II by adding it to phase I over 5 minutes from a dropping funnel, under mechanical stirring at 800 r.p.m. Maintain the stirring until the emulsion is homogeneous (about 5 minutes). Introduce phase III manually rapidly over 30 seconds and reduce the stirring to 500 r.p.m. The stirring was maintained at ambient temperature for 6 hours. The dispersion obtained had a 10% concentration in breaking agent capsules.

The capsules thus obtained were spherical, well separated and resistant to pressure and have regular diameters of 20 to 50 µm. This preparation may be modified so as to encapsulate more or less of the breaking agent. The stability of these capsules was from 4 to 6 days in a bitumen emulsion at 60° C., up to 110 days in water at ambient temperature and more than twelve months in the reaction medium.

The choice of monomers was made from acid dichloride compounds:
adipoyl chloride,
sebacoyl chloride,
2,6-naphthalene acid dichloride etc.

di (or poly)amine compounds:
ethylenediamine,
propylenediamine,
diethylenetriamine,
triethylenetetramine,
aminoethylethanolamine,
dipropylenetriamine, etc.

diisocyanate compounds:
1,6-diisocyanatohexane,
isothane,
toluene diisocyanate, etc.

II. Mixing the capsules with the emulsion

What is claimed is:

1. A bitumen emulsion, comprising:
    bituminous phase comprising one of pure bitumen, fluxed bitumen, and modified bitumen;
    aqueous phase comprising water and emulsifying agent; and
    breaking agent encapsulated in capsules capable of being ruptured by a mechanical effect by a mechanical action produced on the bitumen emulsion so as to allow control of breaking of the bitumen emulsion,
    wherein the capsules comprise a wall comprising polycondensate polymer obtained by interfacial polycondensation.

2. The bitumen emulsion of claim 1, wherein the capsules are stable in water for at least 9 to 10 months.

3. The bitumen emulsion of claim 1, wherein the capsules are capable of withstanding a temperature of 60° C.

4. The bitumen emulsion of claim 1, wherein the capsules are capable of withstanding a temperature of 90° C.

5. The bitumen emulsion of claim 1, wherein the bitumen emulsion is capable of being stored hot for between a few hours and fifteen days without breaking.

6. The bitumen emulsion of claim 1, wherein the capsules are capable of being ruptured at a compaction pressure.

7. The bitumen emulsion of claim 1, wherein the capsules are capable of being ruptured by shearing.

8. The bitumen emulsion of claim 1, wherein the capsules have an average diameter less than 100 µm.

9. The bitumen emulsion of claim 1, wherein the capsules have an average diameter of between 5 and 50 µm.

10. A bitumen emulsion, comprising:
    bituminous phase comprising one of pure bitumen, fluxed bitumen, and modified bitumen;
    aqueous phase comprising water and emulsifying agent; and
    breaking agent encapsulated in capsules capable of being ruptured by a mechanical effect by a mechanical action produced on the bitumen emulsion so as to allow control of breaking of the bitumen emulsion,
    wherein the capsules comprise polyurea.

11. Bitumen emulsion, comprising:
    bituminous phase comprising one of pure bitumen, fluxed bitumen, and modified bitumen;
    aqueous phase comprising water and emusifying agent; and
    breaking agent encapsulated in capsules capable of being ruptured by a mechanical effect by a mechanical action produced on the bitumen emulsion so as to allow control of breaking of the bitumen emulsion,
    wherein the capsules comprise polyamide-polyurea.

* * * * *